(12) United States Patent
Onishi

(10) Patent No.: US 9,088,681 B2
(45) Date of Patent: Jul. 21, 2015

(54) POWER SUPPLY APPARATUS, IMAGE FORMING APPARATUS, POWER SUPPLY SYSTEM, POWER SUPPLY METHOD, AND STORAGE MEDIUM

(71) Applicant: CANON KABUSHIKI KAISHA, Tokyo (JP)

(72) Inventor: Tetsuya Onishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/167,762

(22) Filed: Jan. 29, 2014

(65) Prior Publication Data

US 2014/0211239 A1 Jul. 31, 2014

(30) Foreign Application Priority Data

Jan. 31, 2013 (JP) .................................. 2013-017528

(51) Int. Cl.
*G06F 15/00* (2006.01)
*G06K 1/00* (2006.01)
*G06K 15/00* (2006.01)
*H04N 1/00* (2006.01)

(52) U.S. Cl.
CPC ........ *H04N 1/00885* (2013.01); *G06K 15/4055* (2013.01); *H04N 1/00127* (2013.01)

(58) Field of Classification Search
CPC .......... H04N 1/00885; H04N 1/00127; G06K 15/4055
USPC .................................. 358/1.1, 1.15, 1.13, 1.14
See application file for complete search history.

(56) References Cited

U.S. PATENT DOCUMENTS

2009/0108680 A1* 4/2009 Minemura .................... 307/104

FOREIGN PATENT DOCUMENTS

JP 2011-83085 A 4/2011

* cited by examiner

*Primary Examiner* — Douglas Tran
(74) *Attorney, Agent, or Firm* — Canon U.S.A., Inc., IP Division

(57) ABSTRACT

There is provided a power supply apparatus, an image forming apparatus, and a power supply system including a power supply unit configured to wirelessly supply power to an external device, a received power information reception unit configured to receive received power information representing the power received by the external device, and a power supply control unit configured to control the power supply unit to turn ON/OFF the power supply based on a set power set on the power supply unit and the received power represented by the received power information.

14 Claims, 15 Drawing Sheets

FIG.4

| DEVICE ID | POWER SUPPLY FREQUENCY (KHz) | REQUIRED POWER (mW/min) | BATTERY CHARGE STATUS (%) | POWER SUPPLY | STATUS CODE | PRIORITY FLAG | LINKAGE FLAG | SUPPLIED POWER (mW/min) | RECEIVED POWER (mW/min) |
|---|---|---|---|---|---|---|---|---|---|
| ID01 | 200 | 500 | 50 | Stop | OUT | | | 300 | 150 |
| ID02 | 220 | 200 | 40 | Supply | GOOD | Priority | | 180 | 160 |
| ID03 | 300 | 100 | 30 | Supply | GOOD | | | 90 | 80 |
| ID04 | 320 | 800 | 80 | Supply | GOOD | | Print | 700 | 640 |
| ID05 | 180 | 200 | 90 | Supply | GOOD | | | 180 | 160 |

FIG.14

| DEVICE ID | BATTERY CHARGE STATUS (%) | POWER SUPPLY STATUS | POWER SUPPLY AREA | PRIORITY FLAG | LINKAGE FLAG |
|---|---|---|---|---|---|
| ID01 | 50 | Stop | OUT | | |
| ID02 | 40 | Supply | IN | Priority | |
| ID03 | 30 | Supply | IN | | |
| ID04 | 80 | Supply | IN | | Print |
| ID05 | 90 | Supply | IN | | | ions
POWER SUPPLY APPARATUS, IMAGE FORMING APPARATUS, POWER SUPPLY SYSTEM, POWER SUPPLY METHOD, AND STORAGE MEDIUM

BACKGROUND OF THE INVENTION

1. Field of the Invention

The present invention relates to a power supply apparatus, an image forming apparatus, a power supply system, a power supply method, and a storage medium.

2. Description of the Related Art

Generally, portable terminals such as mobile phones, smart phones, tablet PCs, note PCs and the like are equipped with a battery to thereby eliminate their power cable to enhance the portability and user-friendliness. Also, there is known a technology relevant to a battery charger which charges a battery in a non-contact (wireless) manner without using any connecting means such as a connector.

Further, multifunction peripherals (MFPs) are linked with the above portable terminals and are getting able to perform desired print output and scanner input via a wireless network. As a technology for linking an MFP to portable terminals, there is known a technology which supplies the power to portable terminals through a wireless power supply using an MFP as a power supply point. With this technology, the portable terminals are able to perform processing free from anxiety of battery run-out while being linked with the MFP.

Furthermore, there is known a technology which controls the power supply amount in such a power supply system. For example, Japanese Patent Application Laid-Open No. 2011-83085 discusses a technique in which the power amount at the power supply side and the power amount at the power consuming side are compared, and an electric apparatus consuming the power is selected according to the power generation source at the supply side.

In a wireless power supply system, since a receiving device is configured as wireless, it is conceivable that the receiving device moves while receiving the power from an MFP and the location thereof may change. Thus, there is a possibility of occurrence of a problem due to the change of the location of the receiving device while receiving the power. For example, there is a possibility that an obstacle is positioned between an MFP as a power supply unit and a receiving device, and the power supply may be blocked by the obstacle. Also, there is a possibility that a power receivable foreign matter is positioned between an MFP and a receiving device, and the power may be supplied to the foreign matter from the MFP. In the wireless power supply system, it is desired to eliminate problems caused by a power supply target being a wireless device to achieve efficient power supply processing.

SUMMARY OF THE INVENTION

The present invention is directed to a system capable of performing an efficient power supply processing suitable for wireless reception devices.

Further features of the present invention will become apparent from the following description of exemplary embodiments with reference to the attached drawings.

BRIEF DESCRIPTION OF THE DRAWINGS

FIG. 4 illustrates an example of a data table.
FIG. 14 is a table illustrating an example of display data.

DESCRIPTION OF THE EMBODIMENTS

An exemplary embodiment of the invention will be described below with reference to the appended drawings.

Figure 1:
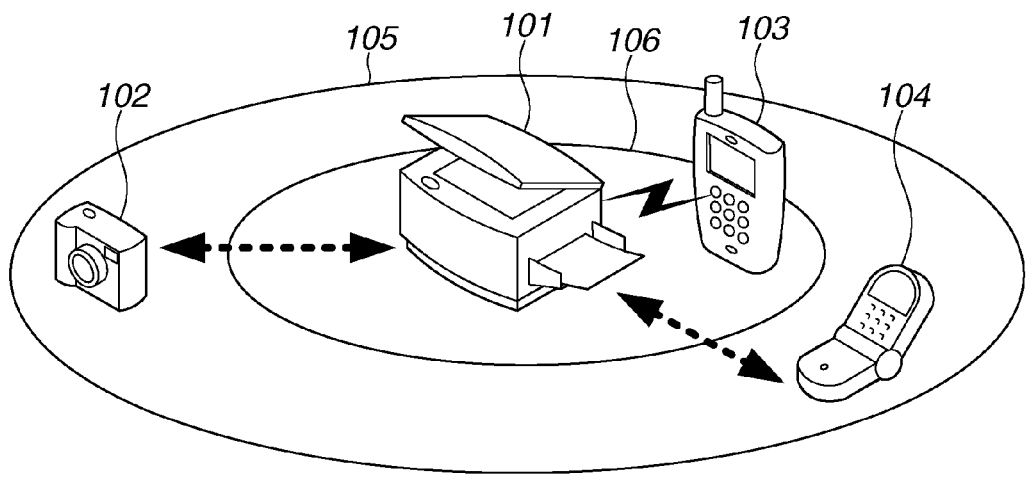
FIG. 1 illustrates a power supply system.

FIG. 1 illustrates a power supply system which includes a digital multi function peripheral/multi function printer (MFP) 101 as an image forming apparatus having a power supply unit and a plurality of external devices. The MFP 101 performs wireless power supply to the plurality of external devices 102, 103, and 104. The MFP 101 according to the present exemplary embodiment is a system including a user monitor for monitoring the wireless power supply and an operation unit for controlling the system.

Referring to FIG. 1, the external device 102 is a digital camera. The external devices 103 and 104 are smart phones. The number and kind of the external devices to which the MFP 101 can supply power are not limited to the present exemplary embodiment.

As illustrated in FIG. 1, the MFP 101 is a power supply point for the wireless power supply. A communicatable area 105 illustrated in FIG. 1 is an area in which a wireless communication with the MFP 101 is possible. That is, the external device is allowed to perform communications with the MFP 101 when the external device is located within the communicatable area 105.

A power suppliable area 106 illustrated in FIG. 1 is an area where the MFP 101 can perform the wireless power supply. In other words, the external devices can receive an appropriate amount of power supply in a wireless manner from the MFP 101 when the external devices are located within the power suppliable area 106. The power suppliable area 106 is a range defined by the power supplied by the MFP 101, that is, by the power supply capacity of the MFP 101.

In the example illustrated in FIG. 1, the external devices 102 and 104 are located out of the power suppliable area 106 but within the communicatable area 105. Therefore, the external devices 102 and 104 perform only communications with the MFP 101. On the other hand, the external device 103 is located within the power suppliable area 106. Therefore, the external device 103 can receive the power supplied by the MFP 101.

The MFP 101 according to the present exemplary embodiment receives information of received power from the external device. Here, the information of received power is information representing the power received from the MFP 101. The MFP 101 controls the power supply based on the information of received power.

Figure 2:
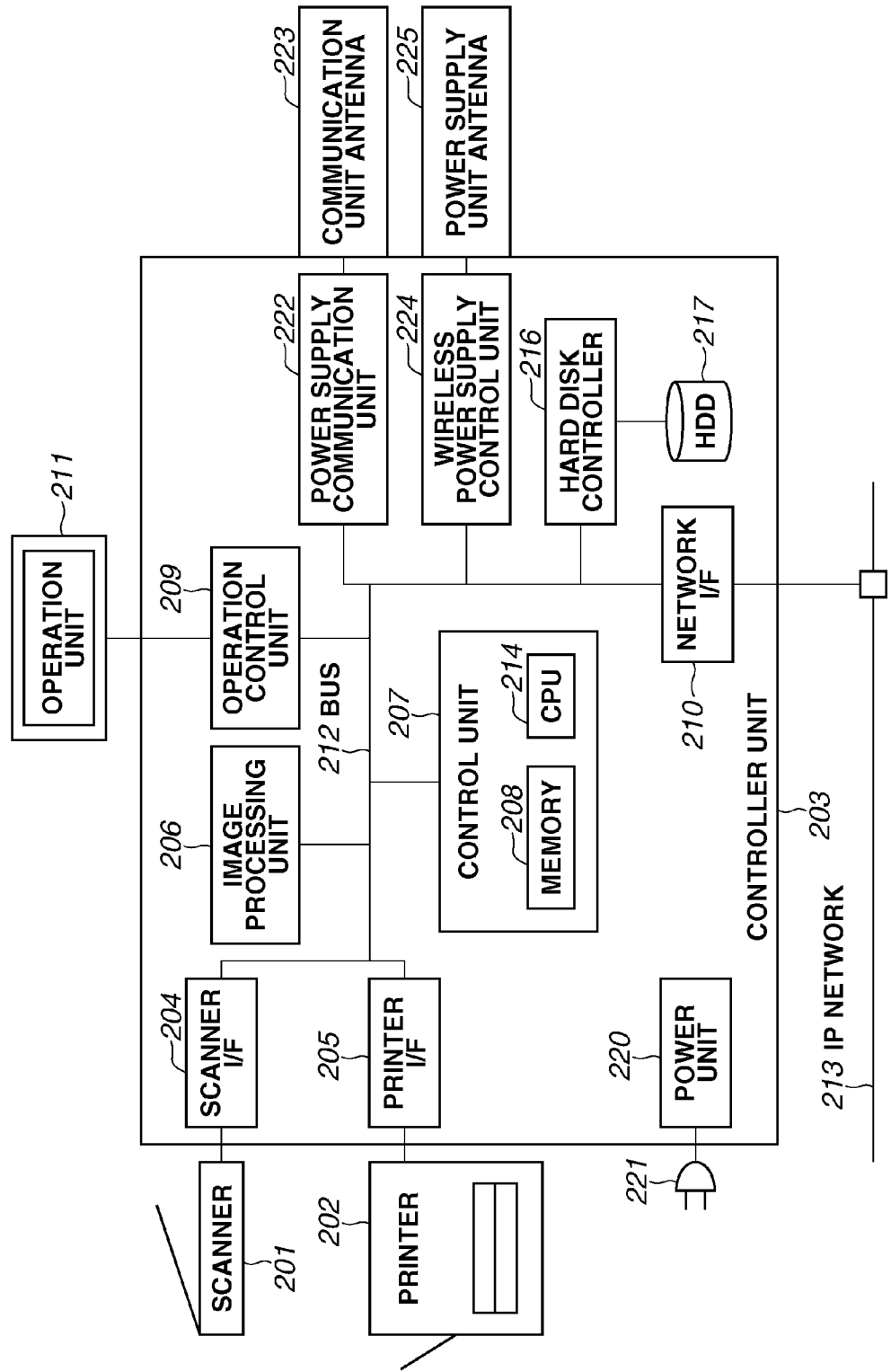
FIG. 2 is a block diagram illustrating an MFP.

FIG. 2 illustrates a configuration of the MFP 101. The MFP 101 includes a controller unit 203, a scanner 201, a printer 202, and an operation unit 211. The scanner 201 has a reading unit for reading information on a document placed on a platen. The MFP 101 allows a document feeder (not shown) to be mounted on the scanner 201. With this, the MFP 101 reads a plurality of documents efficiently. The printer 202 has a printing function. The printer 202 has a printing unit that can print an image read by the scanner 201, an image transferred via an IP network 213, or an image stored in an HDD 217 to output the printed image.

The operation unit 211 functions as a user interface. The operation unit 211 has an input unit and a display unit for displaying information. The input unit is a unit such as a keyboard for allowing the user to input, for example, instruction data and a pointing unit such as a pointing device for specifying an area. The display unit is a display screen for displaying information on the document and the like.

The controller unit 203 includes a scanner interface (I/F) 204, a printer interface (I/F) 205, an image processing unit 206, a control unit 207, and an operation control unit 209. The controller unit 203 also includes the HDD 217 disposed in the MFP 101 as a storage unit and a hard disk controller 216. The controller unit 203 also includes a network interface (I/F) 210 and a bus 212. The network I/F 210 is an interface unit with the external devices. The bus 212 connects the respective units in the controller unit 203 to each other to control the units. The HDD 217 is a storage unit used for temporarily storing various data such as scan images, printing images, and the like.

The image processing unit 206 performs appropriate processing on an image read by the scanner 201 to transfer it to the respective units. The image processing unit 206 transfers the image to, for example, the HDD 217. The image processing unit 206 also transfers a scan image via the network I/F 210. The image processing unit 206 performs appropriate compression processing to transfer it.

The image processing unit 206 also performs processing on an image to obtain a print output of the image through the printer 202. As for a source of print images, images read by the scanner 201 and images stored in the HDD 217 are available. Also as for a source of print images, print images transferred via the IP network 213 and the network I/F 210 are available. The image processing unit 206 performs various processing on the image such as expansion processing, resolution conversion, and the like to print out the appropriate document from the respective image sources.

The control unit 207 controls the image processing unit 206, the scanner I/F 204, and the printer I/F 205, which are connected thereto via the bus 212, to handle the images. The operation control unit 209 controls the operation unit 211 to convert instruction data given by the user into a form with which the instruction and control can be given through the control unit 207.

A power supply unit 221 is connected to an alternating current (AC) power source (commercial power source) via an outlet to supply the power to the entire MFP 101. A power unit 220 converts the AC voltage supplied from the power supply unit 221 into the direct current (DC) voltage to supply the DC power to the respective loads as power. The power unit 220 includes a main power switch (not shown).

A power supply communication unit 222 is a communication unit that communicates with an external device to identify and recognize the device when the MFP 101 performs wireless power supply to the external device (receiving device). The power supply communication unit 222 is connected to a communication unit antenna 223. The power supply communication unit 222 performs a wireless communication with the external device using a wireless communication system such as a communication system.

A wireless power supply control unit 224 is a power supply unit that supplies power to an external device in a non-contact manner. To the wireless power supply control unit 224, a power supply unit antenna 225 is connected. The wireless power supply control unit 224 supplies electrical energy via the power supply unit antenna 225. As a method of non-contact power supply, methods of inductive coupling, electrical field/magnetic field resonance, and radio wave receiving are available. The user is permitted to specify or change the power which the wireless power supply control unit 224 supplies to the external device, i.e., the power supply capacity by operating the operation unit 211.

The control unit 207 controls the entire controller unit 203. The control unit 207 includes a CPU 214 that works as the core of the control. The control unit 207 includes a memory 208 including a control program ROM storing a program executed by the CPU 214, and a work RAM as a temporal use memory.

The following processing of the MFP 101 is realized by the CPU 214 by reading out a program stored in the memory 208 in cooperation with the memory 208 such as the work RAM used as a temporal memory.

Figure 3:
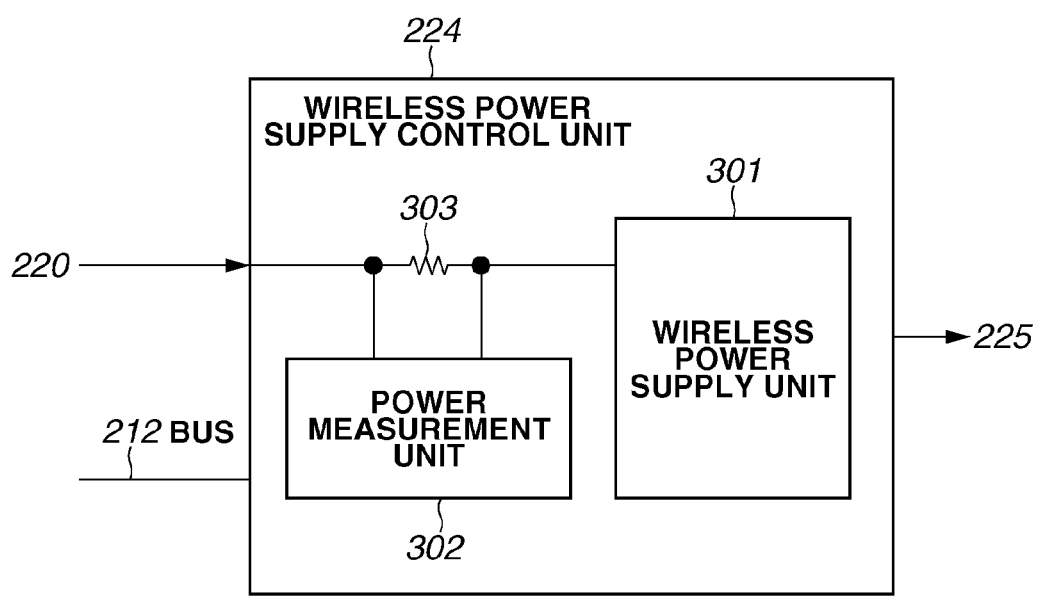
FIG. 3 is a block diagram illustrating a wireless power supply control unit.

FIG. 3 illustrates the wireless power supply control unit 224. The power unit 220 supplies power to a wireless power supply unit 301 via a precision resistance 303. The supplied power is power-converted based on a non-contact power supply system and transferred to the power supply unit antenna 225. The precision resistance 303 has a resistance value of, for example, 1 mΩ. While the current passes through the precision resistance 303, a voltage drop is generated. A power measurement unit 302 reads the voltage across the precision resistance 303 to detect the current supplied to the wireless power supply unit 301.

The power measurement unit 302 measures the supplied power based on the voltage supplied from the power unit 220 and the current consumed per a unit time. In the present exemplary embodiment, the power measurement unit 302 measures the power amount supplied for one minute as the power supply. Here, the unit of the power supply is represented by "mW/min".

The control unit 207 reads the measured power supply via the connected bus 212 to use as the data for controlling the wireless power supply. The configuration for obtaining the power supply is not limited to the present exemplary embodiment.

FIG. 4 schematically illustrates a data table stored in the memory 208. The CPU 214 refers to the data table and updates the data table by performing processing described below. The device ID in the data table is an ID unique to each of the external devices to which the MFP 101 can supply power, i.e., a power suppliable device.

When the MFP 101 cooperates with a external device when, in addition to the power supply processing described below, a printing or scanning operation is performed via the IP network 213, the MFP 101 receives the device ID from the external device. With this operation, the MFP 101 identifies the external device which is in cooperation therewith.

The power supply frequency in the data table represents a resonance frequency of power when the wireless power supply control unit 224 performs power supply to an external device. By changing the frequency, wireless power supply to a specific external device can be performed. In FIG. 4, the unit of the power supply frequency is "KHz".

The requested power in the data table represents the requested power when an external device receives the wireless power supply. The CPU 214 of the MFP 101 according to the present exemplary embodiment sets the requested power to the wireless power supply control unit 224 as the power to be supplied. That is, the requested power is an example of the setting power. In FIG. 4, the unit of the requested power is "mW/min". The CPU 214 obtains the power supply frequency and the requested power from the external device and writes them in the data table in the processing performed below (step S602 in FIG. 9).

The battery charge status in the data table represents a charged amount of a battery included in an external device. The battery charge status is data that the CPU 214 obtains from the external device in the processing described below (step S906 in FIG. 11). In FIG. 4, the unit of the charged amount is "%". The full charged amount is 100%.

The power supply flag in the data table is a flag representing power in-supply or power supply stop. When the power supply is stopped, the CPU 214 sets "stop" to the power supply flag. When the power supply is in supply, the CPU 214 sets "supply" to the power supply flag.

The status code in the data table is a code representing the status of an external device. The status code is information representing the power receiving status of the external device. In the present exemplary embodiment, any one of three flags of "OUT", "GOOD", and "ERR" is set to the status code. The OUT flag represents a state that the external device is located at a position out of the power suppliable area 106 or a position where the power supply from the MFP 101 is interfered by an obstacle. The GOOD flag represents a state that the external device can receive power supply free from any obstacle. The ERR flag represents a state that the external device has some sort of error.

The priority flag in the data table is information representing an external device which has the priority to receive power. The external device corresponding to the priority flag is supplied with power prior to the other external devices. The user is allowed to select and set the priority flag to a desired external device by operating the operation unit 211. The linkage flag in the data table represents an external device operating in cooperation with the MFP 101. Operations performed in cooperation of the MFP 101 and an external device include a scanning and printing operation via the IP network 213.

While the MFP 101 is executing a cooperation operation, when the device ID received from an external device coincides with a device ID in the data table, the MFP 101 sets the linkage flag associating with the device ID. The MFP 101 sets the print flag to, for example, the external device which is in printing operation.

The power supply in the data table represents power measured by the power measurement unit 302 in the processing performed below (step S909 in FIG. 11). The received power in the data table represents power received from the external device in the processing described below (step S925 in FIG. 11).

Figure 5:
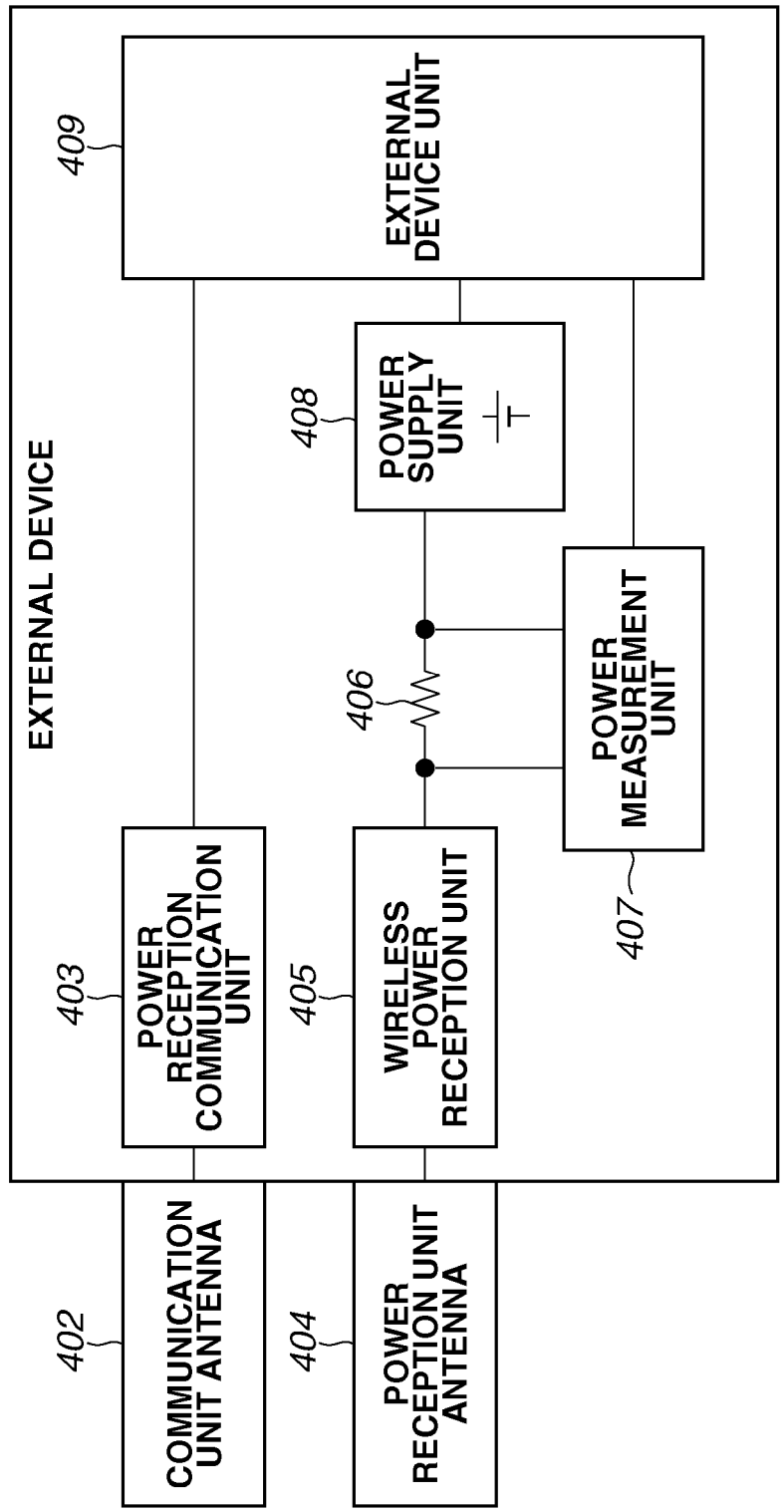
FIG. 5 is a block diagram illustrating an external device.

FIG. 5 illustrates a configuration of an external device. A power reception communication unit 403 is connected to a communication unit antenna 402 for performing a wireless communication with the external device in a wireless communication method such as a proximity communication system. When receiving a wireless power supply from the MFP 101 as the power supply point, the power reception communication unit 403 identifies and recognizes the device. The power reception communication unit 403 also receives and transmits various kinds of information necessary for performing the power supply.

A wireless power reception unit 405 is connected to a power reception unit antenna 404 for receiving a supply of electrical energy via the power reception unit antenna 404. The wireless power reception unit 405 is a power supply unit that receives the power supplied from the power supply point in a non-contact manner and performs a power conversion. The power converted by the wireless power reception unit 405 is supplied to a power supply unit 408 via a precision resistance 406.

A power measurement unit 407 measures the power per unit time, which is supplied in a manner of wireless power supply. The power measurement unit 407 is similar to the power measurement unit 302 of the wireless power supply control unit 224 which has been described above referring to FIG. 3. The data of the measured power is read by the external device unit 409 and used for controlling power. The power supply unit 408 controls the power of the external device based on an instruction of the external device unit 409. The power supply unit 408 includes a battery. When a power reception by using, for example, the wireless power supply starts, the power supply unit 408 performs processing to switch the power source from the battery to the power reception by using the wireless power supply. The power supply unit 408 also switches, for example, the path of power obtained by the wireless power supply to charge the battery.

The external device unit 409 is a unit that controls the entire external device. The external device unit 409 includes a CPU, memories such as a control program ROM and a work RAM as a memory for temporal use (not shown). The following processing of the external device is achieved by the CPU of the external device unit 409 reading out and executing a program stored in the memory.

Figure 6:
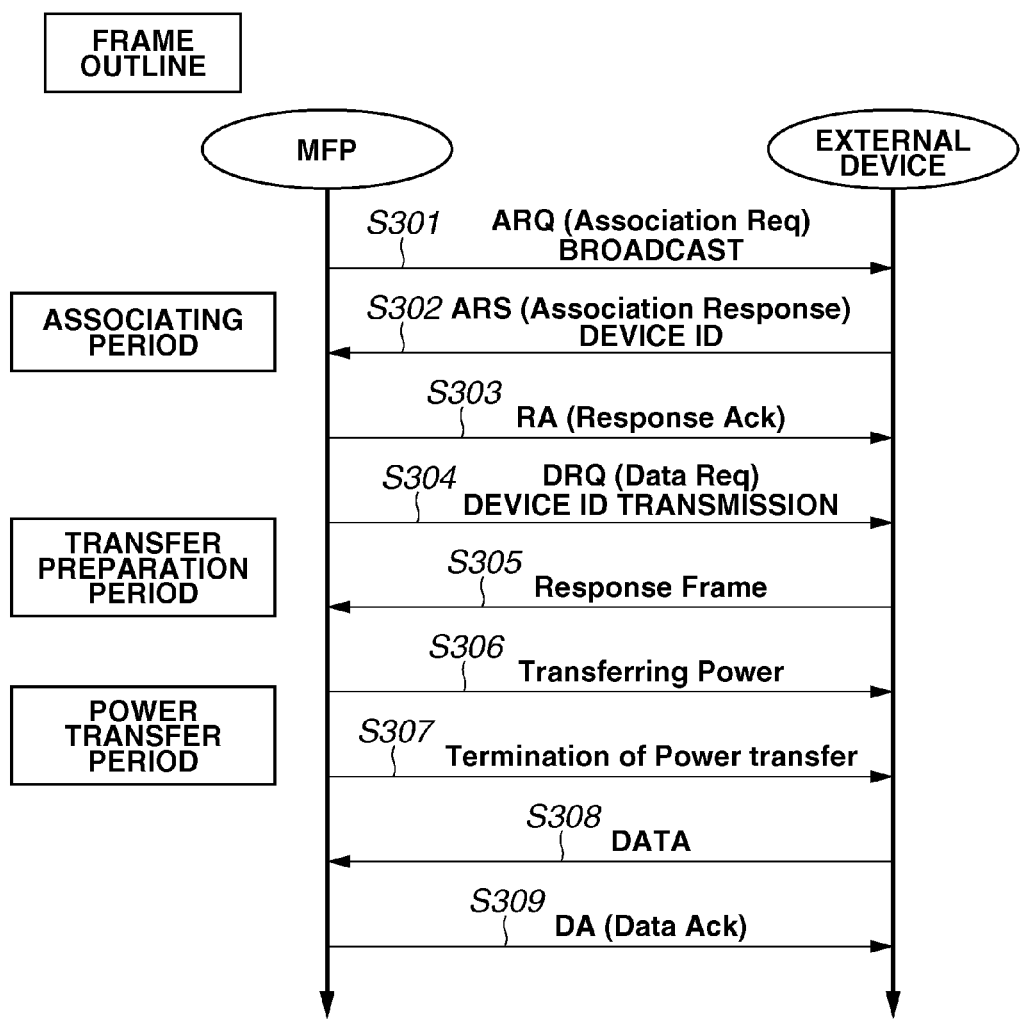
FIG. 6 is a sequence diagram illustrating power supply processing.

FIG. 6 is a sequence diagram illustrating power supply processing performed by the MFP 101. The MFP 101 performs wireless power supply to an external device in the power supply processing. FIG. 6 illustrates only one external device. However, the MFP 101 is capable of performing communication with a plurality of external devices.

As illustrated in FIG. 6, the power supply processing is sorted into three periods, i.e., an associating period (steps S301, S302, and S303), a transfer preparation period (steps S304 and S305), and a power transfer period (steps S306, S307, S308, and S309). The associating period, the transfer preparation period, and the power transfer period constitute one frame. The MFP 101 performs the wireless power supply by repeating the frame.

The steps will be described below in detail.

<Associating Period>

In ARQ (Association Req) processing in step S301, the CPU 214 issues a communication command to the power supply communication unit 222 via the bus 212. The power supply communication unit 222 performs a broadcast communication to the external devices based on the communication command to notify the external device requiring power reception to start the power supply.

In ARS (Association Response) processing in step S302, the CPU 214 receives a device ID from the external device requiring power reception through the power supply communication unit 222 via the bus 212. Through the ARS processing, the CPU 214 detects the external device requiring power reception.

In RA (Response Ack) processing in step S303, the CPU 214 selects the external device to be supplied with the power based on the received device ID. Subsequently, the CPU 214 sends as a response the device ID of the selected external device through the power supply communication unit 222 via the bus 212. With this operation, the CPU 214 acknowledges the power supply to the external device. At this time, the external devices, which have not obtained the authentification, wait for the next frame ARQ processing.

<Transfer Preparation Period>

In DRQ (Data Req) processing in step S304, the CPU 214 transmits the device ID of the external device to be supplied with the power from the power supply communication unit 222 via the bus 212. Subsequently, the CPU 214 makes a request for the information on the external device necessary for performing the power supply to the target external device. The information to be requested includes the power propagation frequency, the power necessary at the device side, information unique to the device, and the like.

In Response Frame processing in step S305, the CPU 214 receives information from the requested external device through the power supply communication unit 222 to obtain the information via the bus 212. The CPU 214 stores the received information in the memory 208. The CPU 214 also executes a program for performing the power supply through the wireless power supply control unit 224 based on the received information. For example, the CPU 214 calculates a power supply period for the external device selected in the associating period. Here, the power supply period is a value set by the CPU 214 based on the wireless supply power from the wireless power supply control unit 224, the power required from the external device, the power transfer efficiency and the like.

<Power Transfer Period>

In Transferring Power processing in step S306, the CPU 214 issues a command to the wireless power supply control unit 224 via the bus 212 to start power supply. The command of power supply period and a command of power supply start are set. In Termination of Power transfer in step S307, when the power supply period ends, the wireless power supply unit 301 terminates the power supply. Further, the CPU 214 receives a notification of power supply termination from the wireless power supply control unit 224 via the bus 212. The CPU 214 also notifies the termination of the power supply to the external device through the power supply communication unit 222.

In DATA processing in step S308, the CPU 214 receives a notification of termination of the power supply from the external device through the power supply communication unit 222 via the bus 212. In step S308, the CPU 214 receives the data of received power, battery charged amount, for example, and stores the data in the memory 208 as the power supply data. In DA (Data Ack) processing in step S309, the CPU 214 notifies a fact that the CPU 214 has received the power supply data, to the external device through the power supply communication unit 222 via the bus 212, and terminates the frame.

The CPU 214 can obtain various kinds of information from the external device by communicating with the power supply communication unit 222 via the bus 212 during the power transfer period. In other words, after executing the Transferring Power processing in step S306, the CPU 214 can appropriately execute the processing in steps S308 and S309 to receive the power supply data from the external device. With this operation, when an unexpected problem occurs on the external device, for example, the CPU 214 can swiftly receive a request such as power supply stop from the external device. As a result, the CPU 214 can stop the power supply to the external device.

Figure 7:
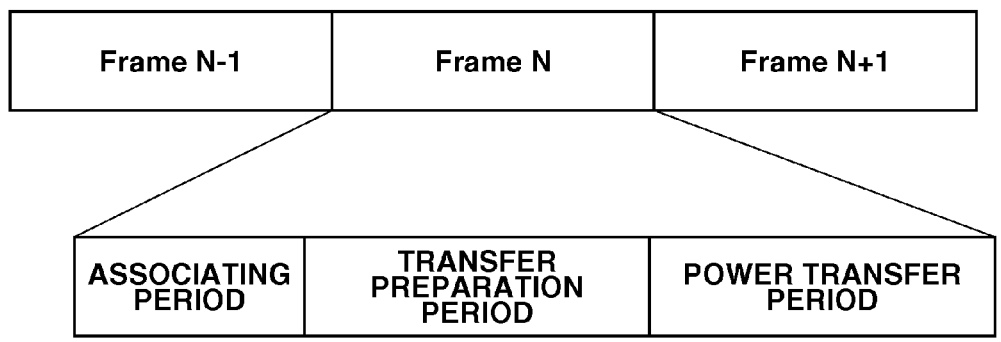
FIG. 7 illustrates a frame.

FIG. 7 illustrates a state of continuous frames in which each frame includes the associating period (steps S301, S302, and S303), the transfer preparation period (steps S304 and S305) and the power transfer period (steps S306, S307, S308, and S309). In each frame, the MFP 101 performs power supply to different external devices which are recognized in the associating periods (steps S301, S302, and S303). The MFP 101 performs power supply to different external devices in the continuous frames, and thereby the MFP 101 performs power supply to the plurality of external devices.

Figure 8:
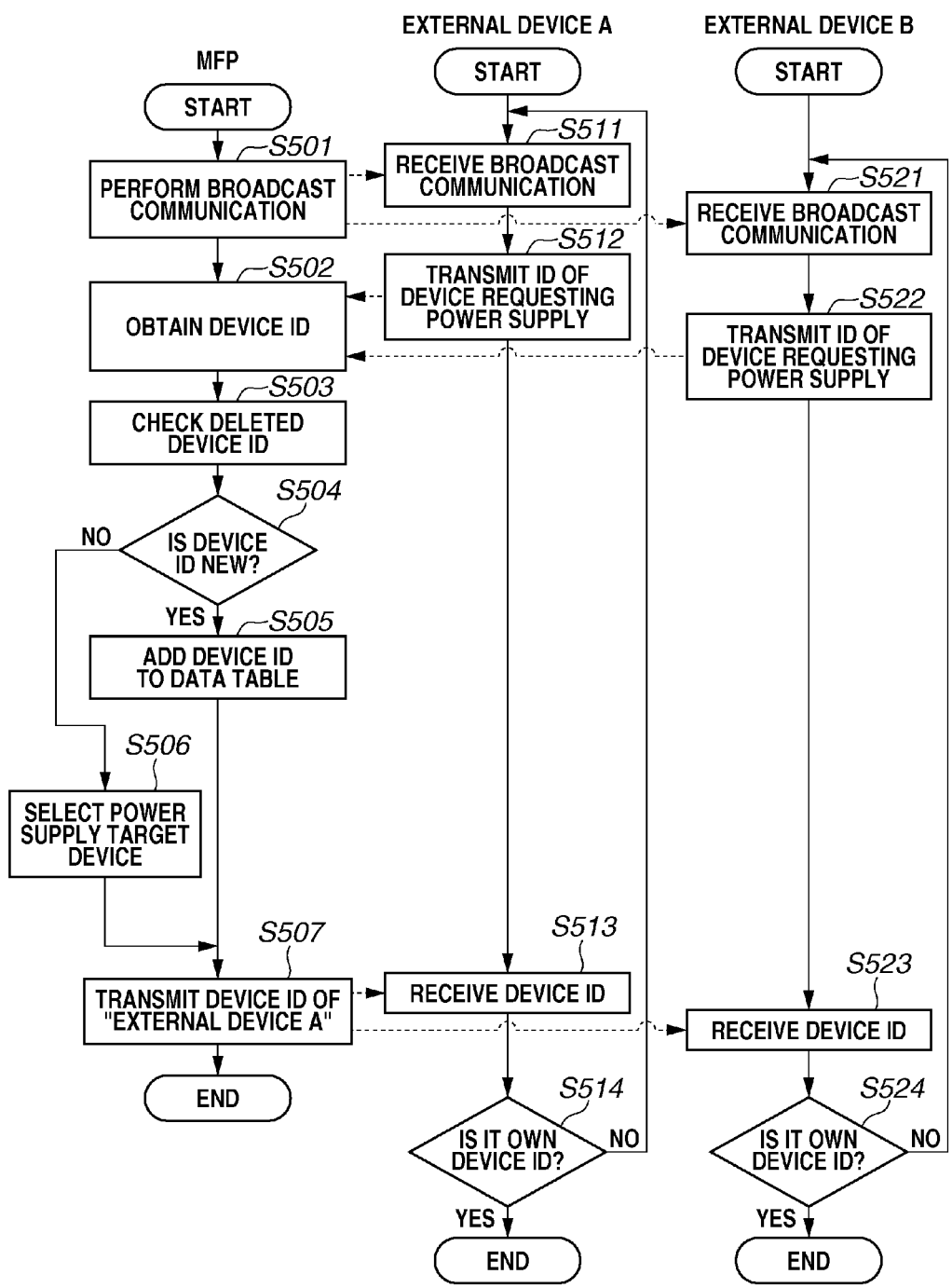
FIG. 8 is a sequence diagram illustrating processing in an associating period.

FIG. 8 is a sequence diagram illustrating processing in the associating period in detail. Referring to FIG. 8, the processing between the MFP 101 and the external devices A and B will be described. The number of the external devices communicatable with the MFP 101 is not limited to the present exemplary embodiment. When the processing starts in the associating period, in step S501, the CPU 214 of the MFP 101 notifies the external devices to start power supply by means of broadcast communication through the power supply communication unit 222.

In steps S511 and S521, each of the external devices A and B receives the information on the power supply start through the broadcast communication from the MFP 101. When each of the external devices A and B requires power reception, the process proceeds to steps S512 and S522. In steps S512 and S522, each of the external devices A and B transmits its own device ID along with a power supply request notification to the MFP 101.

In step S502, the CPU 214 of the MFP 101 receives a device ID of the external device requiring power reception through the power supply communication unit 222. When a plurality of external devices requires power reception, the CPU 214 receives the device IDs in order. Receiving the device ID, the CPU 214 identifies the external device which transmits the device ID as the external device to which the power is suppliable. Here, the external device of the transmission source is identified based on the received device ID.

In step S503, the CPU 214 compares the received device ID (device ID of the power suppliable external device) and the device IDs stored in the data table. When any device ID which is not obtained in step S502 is found in the device IDs stored in the data table, the record corresponding to the ID of the device which is not obtained is deleted from the data table.

In step S504, the CPU 214 refers to the data table and determines whether the device ID obtained in step S502 has been registered in the data table. When the obtained device ID has not been registered in the data table, i.e., when the device ID is of a new external device (YES in step S504), the CPU 214 performs the processing in step S505. When the obtained device ID has been registered in the data table, i.e., when the device ID of an external device to which the power has been already supplied in the executed frame (NO in step S504), the CPU 214 performs the processing in step S506.

In step S505, the CPU 214 creates a record of a new device ID and adds it to the data table. Thus, in the power supply processing in step S505, the CPU 214 appropriately adds information of an external device (power suppliable device) as a new record to update the record. In step S505, the CPU 214 selects the new device ID as a target device to be supplied with the power. When a new external device is detected, the new external device is selected as the target device to be supplied with the power preferentially.

In step S506, the CPU 214 selects an external device to be supplied with power in a current frame from the received device IDs, i.e., the device ID of the device to be supplied with power. In the processing to select the device to be supplied with power, the CPU 214 refers to the power supply capacity of the MFP 101 and the requested power of the respective external devices stored in the data table. More specifically, the CPU 214 assigns a processing period and a frame ID to each frame. The CPU 214 selects the frame ID to select the devices to be supplied with power in order.

In the processing to select the devices to be supplied with power, for example, when the power supply capacity of the wireless power supply unit 301 is sufficient, the CPU 214 selects the devices to be supplied with power on a first-come-first-served basis, or in a previously registered order. When the priority is preset, for example, the CPU 214 may select the devices to be supplied with power in the priority order.

In step S507, the CPU 214 transmits the device ID of the device to be supplied with power to the recognized external devices through the power supply communication unit 222 to notify that the device is acknowledged to be supplied with power. The CPU 214 acknowledges a new external device first. Thus, the processing of the MFP 101 in the associating period is completed. The MFP 101 subsequently performs processing in the transfer preparation period.

On the other hand, in steps S513 and S523, each of the external devices A and B receives the device ID and performs the processing in steps S514 and S524. In steps S514 and S524, each of the external devices A and B determines whether the received device ID is its own device ID.

When the received device ID is its own device ID (YES in steps S514 and S524), each of the external devices A and B terminates the processing in the associating period and performs the processing in the transfer preparation period. When the received device ID is not its own device ID (NO in steps S514 and S524), the processing returns to steps S511 and S521. Then, each of the external devices A and B waits a broadcast communication in the associating period of the next frame. For example, in step S506, when the MFP 101 selects the external device A, the external device A ends the processing in the associating period. Subsequently, the external device A performs the processing in the transfer preparation period. At this time, the external device B returns to the processing in step S521 and waits for the broadcast communication in the associating period of the next frame.

Figure 9:
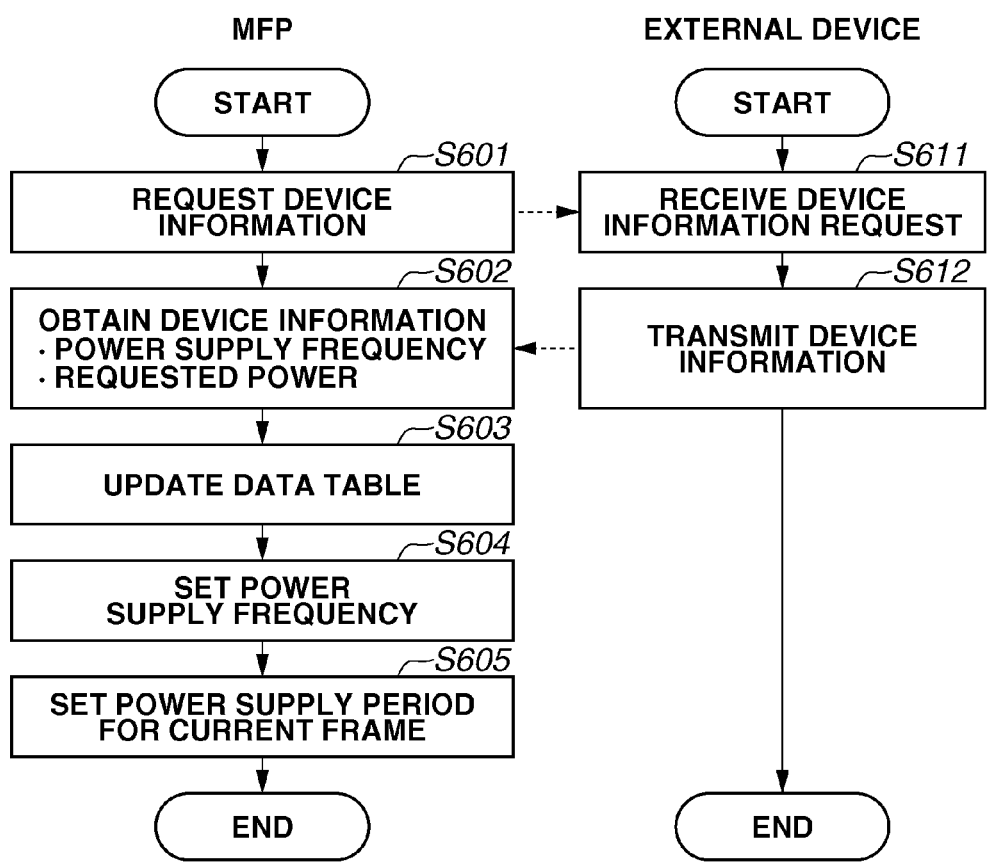
FIG. 9 is a sequence diagram illustrating processing in a transfer preparation period.

FIG. 9 is a sequence diagram illustrating detailed processing in the transfer preparation period. Referring to FIG. 9, a description of the processing in the transfer preparation period will be made using an example of the processing when the external device A is selected in the associating period. In step S601, the CPU 214 of the MFP 101 performs an authentification to transmit a request for the device information along with the device ID of the external device to be supplied with power through the power supply communication unit 222. The device information includes frequency information for performing the power supply and the requested power requested by the external device A when performing the power supply.

In step S612, the external device A receives the request for the device information along with its own device ID. The external device A transmits the requested device information and terminates the processing in the transfer preparation period. On the other hand, In step S602, the CPU 214 of the MFP 101 obtains necessary information, i.e., the device information.

In step S603, the CPU 214 adds the obtained device information to the data table while associating the device information to the device ID. In other words, the CPU 214 updates the data table. Subsequently, the CPU 214 refers to the data table to set the power supply frequency and the requested power to the wireless power supply control unit 224 in step S604. In step S605, the CPU 214 refers to the data table to calculate the power supply period of the current frame, and sets the power supply period to the wireless power supply control unit 224. In this way, the processing of the MFP 101 in the transfer preparation period is completed.

A description will be made on the processing of the CPU 214 to calculate the power supply period of the external device as the target of the power supply referring to the data table in step S605. It is assumed that, for example, three external devices of device IDs 03, 02, and 05 are registered in the data table. In this case, the CPU 214 refers to the data table in FIG. 4 based on the respective device IDs to allocate the frames below.

Frame 1: device ID 03; 300 mW/min; power supply for 20 seconds

Frame 2: device ID02; 600 mW/min; power supply for 20 seconds

Frame 3: device ID05; 600 mW/min; power supply for 20 seconds

Figure 10:
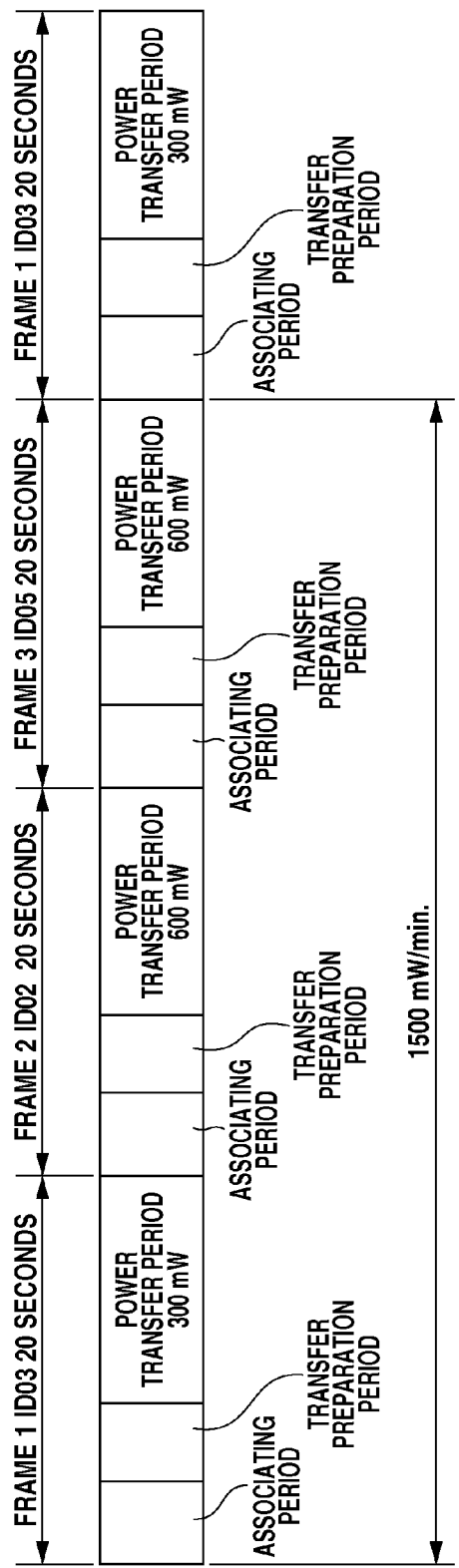
FIG. 10 illustrates an example of frame allocation result.

For example, when the requested power of the external device with the device ID 03 is 100 mW/min, the requested power 100 mW/min to the external device with the device ID 03 for 1 minute is satisfied by supplying the power for 20 seconds with the power supply capacity of 300 mW/min. Thus, the frame processing is executed to perform the power supply in the order of frame 1, 2, 3, and 1 . . . . FIG. 10 is a schematic diagram illustrating the result of the frame allocation. Thus, the frame processing is executed continuously.

The above-described processing takes 20 seconds including the associating period, the transfer preparation period, and the power transfer period. Since the power transfer period per frame takes a period of 90% or more of one frame, the CPU 214 may calculate the power supply period defining the power transfer period as 20 seconds, as another example.

Figure 11:
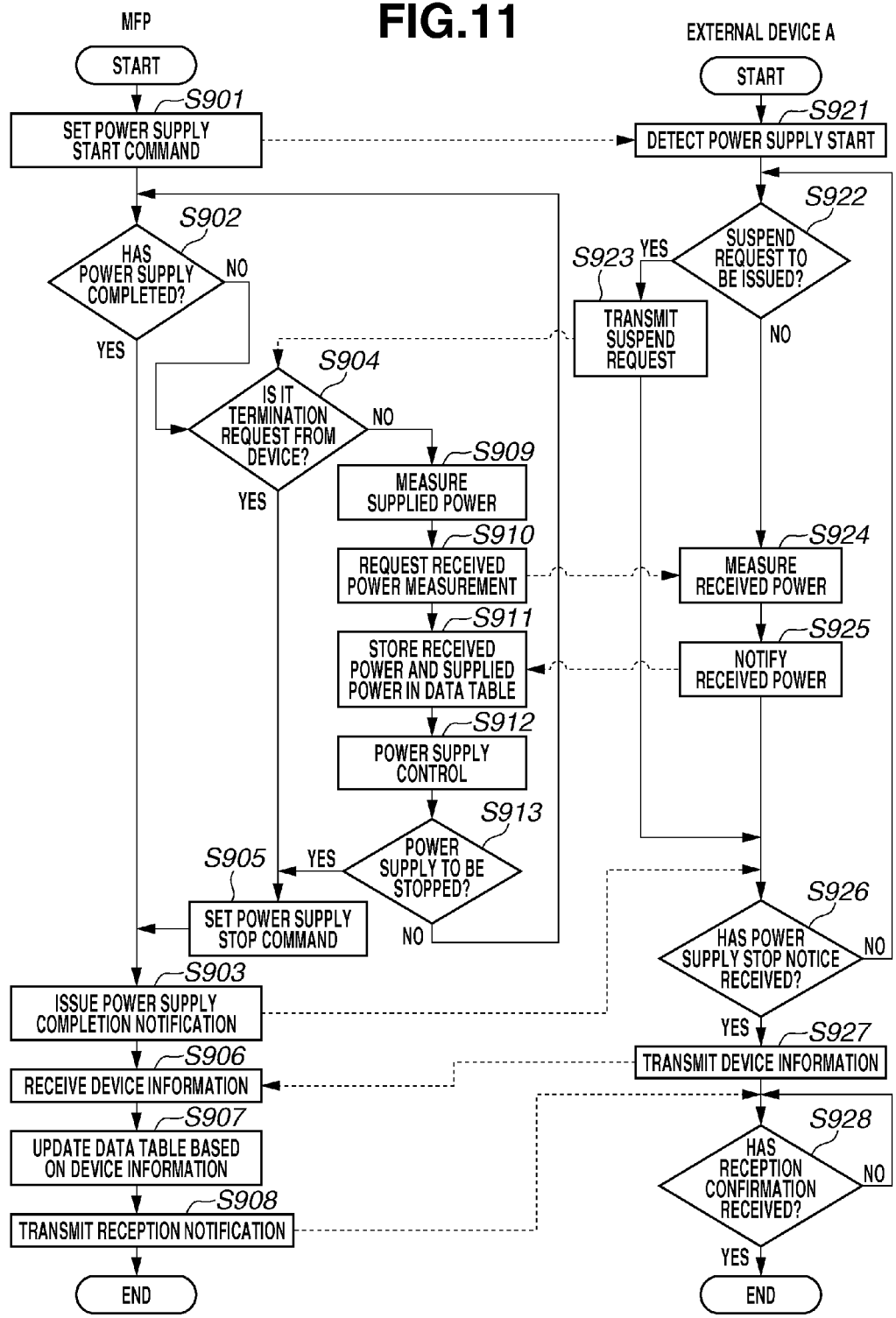
FIG. 11 is a sequence diagram illustrating processing in a power transfer period.

FIG. 11 is a sequence diagram illustrating detailed processing in the power transfer period. Referring to FIG. 11, a description of the processing in the power transfer period will be made using an example of the processing when the external device A is selected in the associating period. In step S901, the CPU 214 of the MFP 101 sets a power supply start command on the wireless power supply control unit 224. With this operation, the MFP 101 starts the power supply (power supply processing). On the other hand, in step S921, the external device A detects that the MFP 101 starts the power supply.

In step S922, the external device A determines whether the external device A is to request the MFP 101 to stop the power supply. For example, when a predetermined condition is satisfied, the external device A requests the MFP 101 to stop the power supply. A condition for handling an unexpected problem is preset on the external device A.

In step S922, when requesting for termination of the power supply (YES in step S922), the processing proceeds to step S923. In step S923, the external device A transmits a suspend request to the MFP 101. Subsequently, the processing proceeds to step S926.

When the external device A does not request for termination of the power supply (NO in step S922), the processing proceeds step S924. In step S924, the power measurement unit 407 of the external device A measures the received power. Subsequently, in step S925, the external device A transmits the received power information representing the received power level measured by the power measurement unit 407 to the MFP 101. Subsequently, the processing proceeds to step S926. Thus, the external device A repeats the processing from S922 to S926 until the external device A receives a notification of power supply termination.

On the other hand, the CPU 214 of the MFP 101 receives an interrupt signal sent from the wireless power supply control unit 224 and recognizes the termination of the power supply period in step S902. When the CPU 214 receives interrupt signal and recognizes the termination (YES in step S902), the processing proceeds to step S903. When the CPU 214 receives no interrupt signal (NO in step S902), the processing proceeds to step S904. In step S904, the CPU 214 performs communication with the external device A via the power supply communication unit 222 to determine whether the suspend request of the power supply is received. When the CPU 214 determines that the suspend request is received (YES in step S904), the processing proceeds to step S905. When the CPU 214 receives no suspend request (NO in step S904), the processing proceeds to step S909.

In step S909, the CPU 214 determines the supplied power (supplied power determination processing). In particular, the CPU 214 obtains the supplied power measured by the power measurement unit 302 through the wireless power supply control unit 224. In step S910, the CPU 214 transmits a measurement request of the received power to the external device A. In this case, the external device A measures the received power in step S924, and transmits the information of the received power to the MFP 101 in step S925.

In step S911, the CPU 214 of the MFP 101 receives information of received power from the external device A (received power information reception processing). The CPU 214 stores the information of the received power and the supplied power obtained in step S910 in the data table while associating the device ID of the external device A, and updates the data table. In step S912, the CPU 214 controls the wireless power supply unit 301 to turn ON/OFF of the power supply based on the requested power, the received power, and the supplied power, which are associated with the external device A in the data table. The processing in step S912 will be described below in detail with reference to FIG. 12.

When the CPU 214 determines to stop the power supply (YES in step S913), the processing proceeds to step S905. When the CPU 214 determines to continue the power supply (NO in step S913), the processing proceeds to step S902. The MFP 101 repeats the above-described processing until the power supply ends.

In step S905, the CPU 214 sets a power supply stop command to the wireless power supply control unit 224 based on the suspend request of the power supply. With this operation, the wireless power supply control unit 224 stops the power supply. When the power supply is terminated or stopped, the CPU 214 of the MFP 101 issues a notification of power supply termination to the external device via the power supply communication unit 222 in step S903, and requests for the device information such as a status code, a battery charge status, and the like of the external device A.

When the external device A receives the notification of power supply termination from the MFP 101 (YES in step S926), the processing proceeds to step S927. In step S927, the external device A transmits the device information of the external device A such as a status code and a battery charge status, which are requested by the MFP 101, to the MFP 101.

In step S906, the CPU 214 of the MFP 101 receives the device information of the external device A through the power supply communication unit 222. In step S907, the CPU 214 updates the data table based on the received device information. More specifically, the CPU 214 writes the status code and the battery charge status corresponding to the device ID of the external device A on the data table. In step S908, the CPU 214 transmits a reception notification of the device information to the external device A. Thus, the processing of the MFP 101 in the power transfer period is completed. In step S928, the external device A receives the reception notification of the device information from the MFP 101. Thus, the processing of the external device A in the power transfer period is completed.

Figure 12:
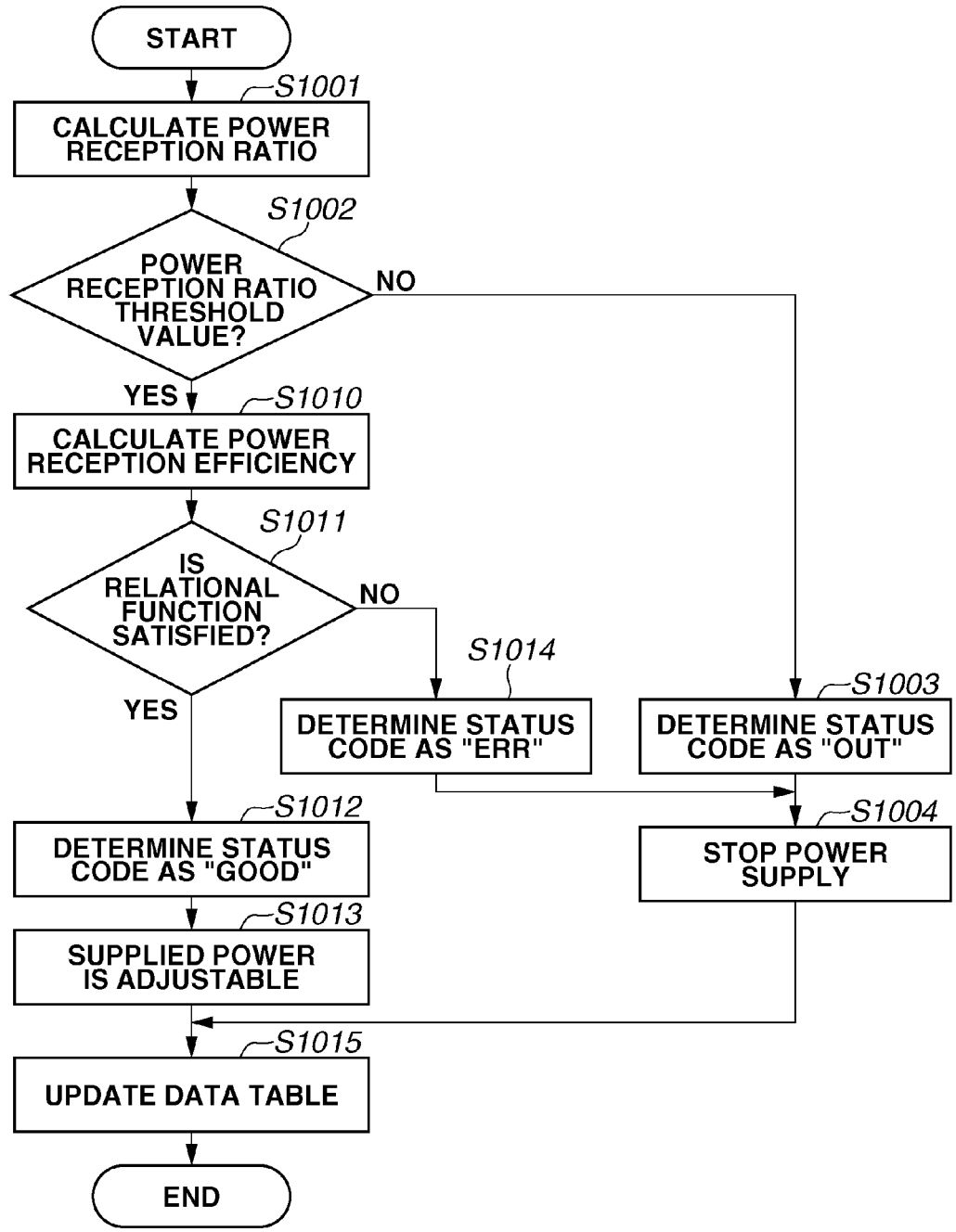
FIG. 12 is a flow chart illustrating power supply control processing.

FIG. 12 is a flowchart illustrating the power supply control processing performed by the MFP 101 in step S912 in FIG. 11. In step S1001, the CPU 214 of the MFP 101 calculates the power reception ratio, which is a ratio of the received power with respect to the requested power as a set power. More specifically, the CPU 214 calculates the power reception ratio (%) using formula 1 (power reception ratio calculation processing).

$$\text{Power reception ratio} = (\text{received power} = \text{requested power}) \times 100 \quad \text{(formula 1)}$$

In step S1002, the CPU 214 compares the power reception ratio with a preset threshold value. In the present exemplary embodiment, the threshold value is set to 40%. The threshold value is preset in the memory 208 or the like of the MFP 101, for example. The threshold value is an arbitrary value. When the power reception ratio is larger than or equal to the threshold value (YES in step S1002), the processing proceeds to step S1010 to continue the power supply. On the other hand, when the power reception ratio is smaller than the threshold value (NO in step S1002), the processing proceeds to step S1003 to perform the processing to stop the power supply.

In the wireless power supply, as the distance from the power supply point get larger, the supplied power diffuses in a wider range. Therefore, it is conceivable that the power reception ratio of the external device becomes smaller as the distance from the power supply point to the external device becomes larger. Also, in the wireless power supply, any obstacle of the power existing between the power supply point and the external device also causes the power reception ratio of the external device to decrease.

When the power reception ratio of the external device is small, the power supply efficiency from the MFP 101 is poor. Therefore, it is not preferable to continue the power supply. Therefore, the MFP 101 according to the present exemplary embodiment controls the power supply to turn ON/OFF based on a comparison result between the power reception ratio and the threshold value.

When the power reception ratio is smaller than the threshold value, it is conceivable that the external device A may be located outside the power supply area, or some obstacle of the power may exist between the external device A and the MFP 101. In such a case, the CPU 214 determines the status code as OUT in step S1003. In step S1004, the CPU 214 stops the power supply from the wireless power supply unit 301 (power supply control processing).

On the other hand, when the power reception ratio is larger than or equal to the threshold value (YES in step S1002), in the processing after step S1010, the CPU 214 determines whether there are any foreign matter other than the external device as the target of power supply absorbing the power between the external device A and the MFP 101. If such foreign matter exists, the power supply from the MFP 101 is absorbed by the foreign matter, resulting in poor power supply efficiency. Further, the foreign matter may create a dangerous situation such as overheating. Therefore, the MFP 101 according to the present exemplary embodiment controls the ON/OFF operation of the power supply based on the existence/absence of such a foreign matter.

In step S1010, the CPU 214 calculates the power supply efficiency as the ratio of the received power with respect to the supplied power. More specifically, the CPU 214 calculates the power supply efficiency (%) using formula 2 (power supply efficiency calculation processing).

$$\text{Power supply efficiency}=(\text{received power}\div\text{supplied power})\times 100 \quad \text{(formula 2)}$$

Subsequently, in step S1011, the CPU 214 determines whether a relational function of formula 3 is satisfied with respect to the calculated power supply efficiency and the power reception efficiency (relation determination processing).

$$\text{Power supply efficiency}=F(\text{power reception ratio}) \quad \text{(formula 3)}.$$

Here, F (power reception ratio) is a function which includes the power reception ratio as a variable. When the value of the power supply efficiency obtained in step S1010 is within an allowable range of difference with respect to a value of the power supply efficiency obtained based on the power reception ratio using the formula 3, in step S1011, the CPU 214 determines that the relational function is established between the power supply efficiency and the power reception efficiency.

The values of the received power used for calculating the power reception ratio and the power supply efficiency, the requested power used for calculating the power reception ratio, and the power supply used for calculating the power supply efficiency are the values each obtained at corresponding timing. Here, the corresponding timing means the timing which can be determined as substantially the same timing. Thus, these values of the received power, the requested power, and the power supply are the values obtained within a range of timing which is determined as the same timing. The relational function and the difference range can be set arbitrarily. The relational function and the difference range are previously stored in the memory 208 or the like by the CPU 214 (relational information storing processing).

A description will be made on the relational function. As the power supply distance from the power supply point to the external device becomes larger, the electrical linkage for performing the power supply changes from a strong state to a weak state. When the electrical linkage changes from the strong state to the weak state, in the wireless power supply unit 301, the power load to the external device A, which is connected in a wireless manner, changes to become smaller. When the load becomes smaller, the power supply measured by the wireless power supply control unit 224 becomes smaller.

By using the value of the power supply efficiency as an index value representing the state of the electrical linkage and the power reception ratio as an index value representing the power supply distance, the relationship between the power supply efficiency and the power reception ratio can be expressed by the above relational function of formula 3. The relational function may be a linear function or a quadratic function, for example.

However, if any foreign matter absorbing the power exists other than the external device as the power supply target, the power supply from the MFP 101 is absorbed by the foreign matter. Therefore, the external device cannot receive the power corresponding to the power supply from the MFP 101. Thus, in this case, the relational function of formula 3 is not satisfied. Therefore, the MFP 101 is configured to determine the existence/absence of the foreign matter which absorbs the power, based on whether the relational function is satisfied by the actually calculated power reception ratio and the power supply efficiency.

In the present exemplary embodiment, the CPU 214 uses the relational function to determine whether the power efficiency and the power reception ratio are in an ideal relationship where no foreign matter exists. But the present exemplary embodiment is not limited to thereto. As another example, the MFP 101 previously stores relational information, which represents an ideal relationship between the power efficiency and the power reception ratio where no foreign matter exists, in the memory 208 or the like. And the CPU 214 may determine whether the actually obtained power efficiency and the power reception ratio are in the relationship represented by the relational information based on the relational information. The relational information may be represented by a relational table in which the power reception ratio and an ideal power supply efficiency obtained based on the power reception ratio are associated, for example.

When the relational function is satisfied with respect to the calculated power supply efficiency and the power reception ratio (YES in step S1011), the processing proceeds to step S1012 to continue the power supply. In step S1012, the CPU 214 determines the status code as GOOD. Subsequently, the CPU 214 determines that the power supply is adjustable in step S1013. When the power supply is determined as adjustable, the CPU 214 may appropriately change the power supply. For example, the CPU 214 compares the received power in the previous frame and the received power in the current frame. When the received power of the current frame is smaller than the received power of the previous frame, the CPU 214 increases the power supply. With this operation, the received power of the external device A can be made closer to the requested power of the external device A.

On the other hand, when the relational function is not satisfied with respect to the calculated power supply efficiency and the power reception ratio (NO in step S1011), the processing proceeds to step S1004. In step S1004, the CPU 214 stops the power supply from the wireless power supply unit 301 (power supply control processing). The CPU 214 determines the status code as ERR, and the processing proceeds to step S1015. In step S1015, the CPU 214 appropriately updates the data table while associating the status code and the power supply with the device ID of the external device A, and terminates the processing.

Figure 13:
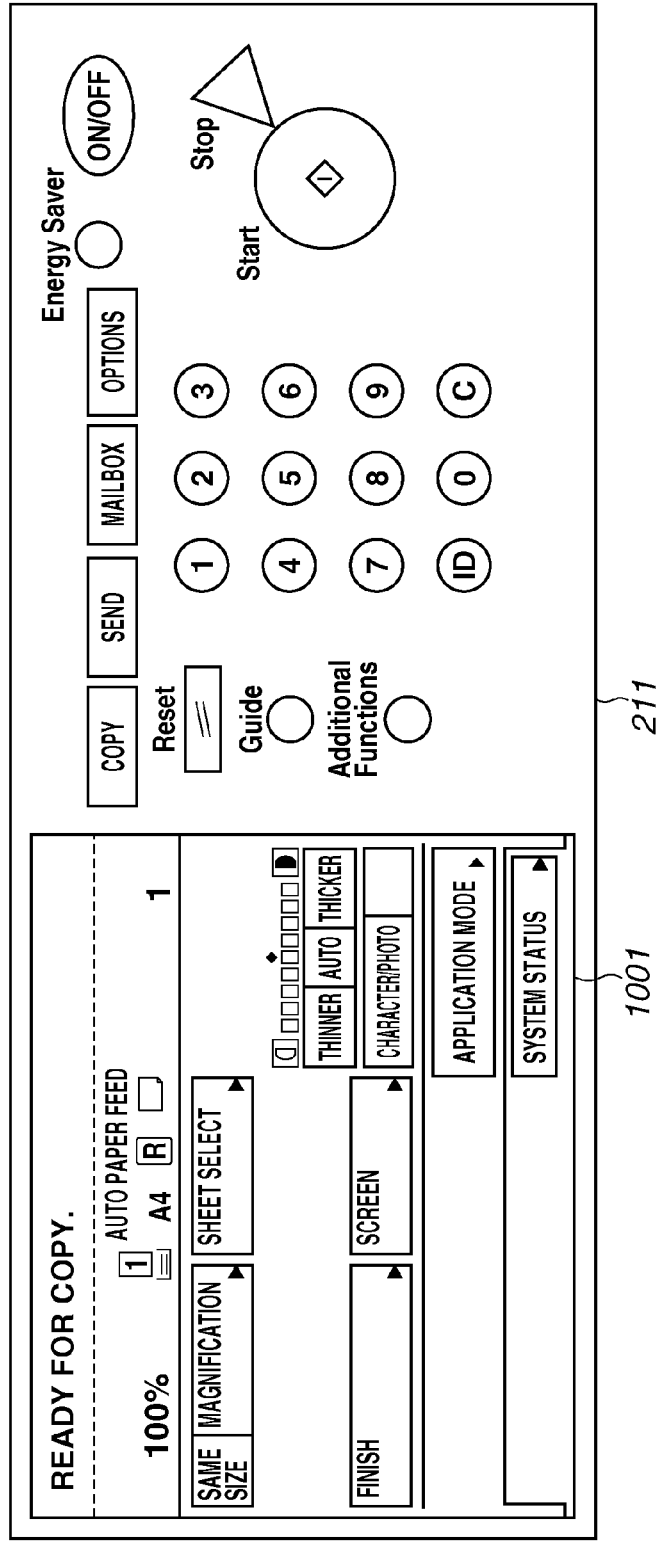
FIG. 13 illustrates an operation unit.

The CPU 214 also performs processing to display information on the power supply to the respective external devices on the operation unit 211 referring to the data table. FIG. 13 illustrates the operation unit 211. The operation unit 211 includes an operation screen 1001 and a plurality of option buttons 1002. The operation screen 1001 is configured of a liquid crystal operation touch panel. For example, when a user operates any of the option buttons 1002, the screen of the operation screen 1001 shifts. The user can make various settings on the operation screen 1001.

When the operation screen 1001 is shifted by using an option button 1002, for example, power supply information display setting buttons (not shown) are displayed on the operation screen 1001. The power supply information display setting buttons are buttons through which the MFP 101 receives an instruction to display the power supply information made by the user.

A description will be made on the processing to display the power supply information for each unit on the operation unit 211. When a user selects a power supply information display button through the operation unit 211, a power supply information display request is transmitted to the CPU 214 from the operation control unit 209 via the bus 212. The CPU 214 reads out the information necessary for displaying the information from the data table and creates display data as illustrated in FIG. 14. The display data includes a device ID registered in the data table. The display data further includes a battery charge status, a power supply status, a power supply area, a priority flag, and a linkage flag corresponding to the device ID.

As described above, the battery charge status is represented in % unit. The power supply status corresponds to the power supply flag on the data table. In the power supply information, "Supply" is displayed when the power is being supplied and "Stop" is displayed when the power supply is stopped.

The power supply area corresponds to the area in the data table. An external device with no error and the status code of which in the data table is "GOOD" is located within the power suppliable area 106. Therefore, the corresponding power supply area is indicated as IN. An external device with no error and the status code of which in the data table is "OUT" is located out of the range of the power suppliable area 106. Therefore, the power supply area corresponding to the external device is indicated as "OUT".

The priority flag corresponds to the priority flag in the data table. The priority flag of the external device set by a user as the external device to be supplied with power prior to the other devices, "Priority" is indicated. The linkage flag corresponds to the linkage flag in the data table. The linkage flag indicates a state in which the external device is linked with the MFP 101. For example, when the external device is in printing operation, "Print" is indicated. When the external device is in scanning operation, "Scan" is indicated. The CPU 214 transfers the created display data via the bus 212 and issues a display command to the operation control unit 209. The operation control unit 209 displays the display data on the operation screen 1001 of the operation unit 211 based on the display command.

Figure 15:
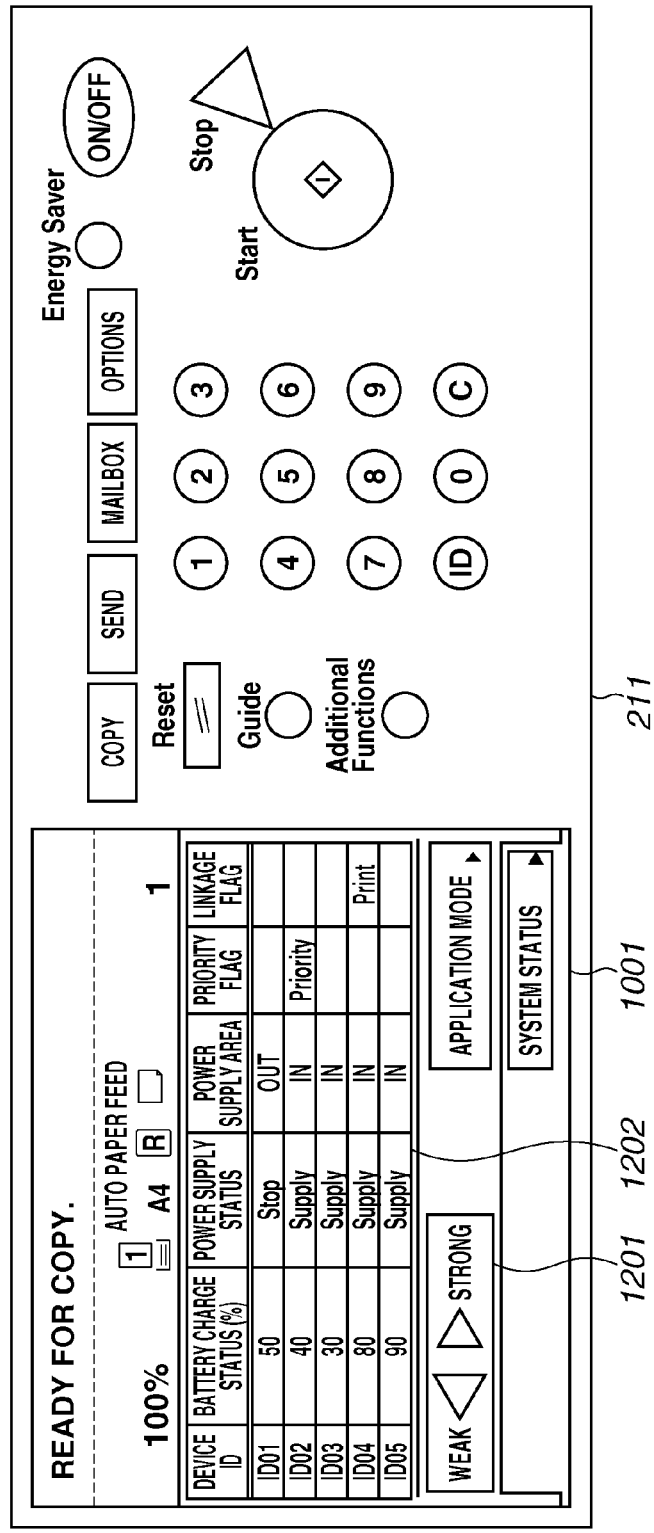
FIG. 15 illustrates an example of a display of a display data screen.

FIG. 15 illustrates an example of a display data screen displayed on the operation screen 1001. A display data screen 1202 in FIG. 15 corresponds to the display data in FIG. 14. The display data in FIG. 14 is displayed on the operation unit 211 as illustrated in FIG. 15. The display data screen 1202 displays the state of an external device with the device ID01; i.e., the battery power reception state as 50%, the power supply state as Stop, located out of the power suppliable area 106 with no priority flag or linkage flag.

Also, the display data screen 1202 displays the state of an external device of device ID02; i.e., the battery power reception state as 40%, located within the power suppliable area 106, the power supply state as Supply, with Priority flag but with no linkage flag.

Also, the display data screen 1202 displays the state of an external device with the device ID04; i.e., the battery power reception state as 80%, located within the power suppliable area 106, the power supply state as Supply with no priority flag. Furthermore, the display data screen 1202 displays the state of an external device with the device ID04; i.e., the linkage flag as Print, and the external device is linked with the MFP 101.

The user is allowed to operate the touch panel operation screen 1001 to make various settings such as selecting a desired device ID and setting the priority flag or the like. The user also operates the operation screen 1001 to make settings on the external devices located within the power suppliable area 106 such as power supply start, power supply stop, or the like. When any change is made on the operation screen 1001, a change instruction is transmitted to the CPU 214 via the operation control unit 209 and the bus 212, and the CPU 214 performs control.

When the preset conditions are satisfied, the CPU 214 displays a power supply capacity change key 1201 on the operation screen 1001 along with the display data screen 1202. Here, the power supply capacity change key 1201 is a user interface for receiving a change instruction of the range of the power suppliable area 106, i.e., the power supply capacity of the wireless power supply unit 301.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-017528 filed Jan. 31, 2013, which is hereby incorporated by reference herein in its entirety.

What is claimed is:

1. A power supply apparatus comprising:
a wireless power supply unit configured to wirelessly supply power to an external device;
a specifying unit configured to specify efficiency of power supply to the external device; and
a determining unit configured to determine whether to stop the power supply to the external device based on the efficiency of power supply specified by the specifying unit,
wherein, in a case where the determining unit determines to stop the power supply to the external device, the wireless power supply unit stops the power supply to the external device.

2. The power supply apparatus according to claim 1, further comprising:
an acquiring unit configured to acquire, from the external device, received power information indicating power received by the external device,
wherein the specifying unit specifies the efficiency of power supply based on the received power information acquired by the acquiring unit.

3. The power supply apparatus according to claim 2, further comprising:
a requesting unit configured to transmit a request for the received power information to the external device;
wherein the acquiring unit acquires the received power information from the external device as a response to the request transmitted by the requesting unit.

4. The power supply apparatus according to claim 2, wherein the specifying unit specifies the efficiency of power supply based on the received power information and the power supplied to the external device by the wireless power supply unit.

5. The power supply apparatus according to claim 1, wherein in a case where a difference between the efficiency of power supply specified by the specifying unit and a reference value is not within a predetermined range, the determining unit determines to stop the power supply to the external device.

6. A printing apparatus comprising:
a wireless power supply unit configured to wirelessly supply power to an external device;
a specifying unit configured to specify efficiency of power supply to the external device; and
a determining unit configured to determine whether to stop the power supply to the external device, based on the efficiency of power supply specified by the specifying unit,
wherein in a case where the determining unit determines to stop the power supply to the external device, the wireless power supply unit stops the power supply to the external device.

7. The printing apparatus according to claim 6, further comprising:
an acquiring unit configured to acquire, from the external device, received power information indicating power received by the external device,
wherein the specifying unit specifies the efficiency of power supply based on the received power information acquired by the acquiring unit.

8. The printing apparatus according to claim 7, further comprising:
a requesting unit configured to transmit a request for the received power information to the external device,
wherein the acquiring unit acquires the received power information from the external device as a response to the request transmitted by the requesting unit.

9. The printing apparatus according to claim 7, wherein the specifying unit specifies the efficiency of power supply based on the received power information and the power supplied to the external device by the wireless power supply unit.

10. The printing apparatus according to claim 6, wherein in a case where a difference between the efficiency of power supply specified by the specifying unit and a reference value is not within a predetermined range, the determining unit determines to stop the power supply to the external device.

11. A power supply method executed by a power supply apparatus comprising:
wirelessly supplying power to an external device;
specifying efficiency of power supply to the external device;
determining whether to stop the power supply to the external device based on the specified efficiency of power supply; and
in responsive to determining to stop the power supply to the external device, stopping the power supply to the external device.

12. A storage medium storing a program that causes a computer to function as:
a wireless power supply unit configured to wirelessly supply power to an external device;
a specifying unit configured to determine whether to stop the power supply to the external device; and
a determining unit configured to determine whether to stop the power supply to the external device based on the efficiency of power supply specified by the specifying unit,
wherein, in a case where the determining unit determines to stop the power supply to the external device, the wireless power supply unit stops the power supply to the external device.

13. A power supply method executed by a printing apparatus comprising:
wirelessly supply power to an external device;
specifying efficiency of power supply to the external device;
determining whether to stop the power supply to the external device based on the specified efficiency of power supply; and
in responsive to determining to stop the power supply to the external device, stopping the power supply to the external device.

14. A storage medium storing a program that causes a printing apparatus to function as:
a wireless power supply unit configured to wirelessly supply power to an external device;
a specifying unit configured to determine whether to stop the power supply to the external device; and
a determining unit configured to determine whether to stop the power supply to the external device based on the efficiency of power supply specified by the specifying unit,
wherein, in a case where the determining unit determines to stop the power supply to the external device, the wireless power supply unit stops the power supply to the external device.

* * * * *